United States Patent [19]

Logan et al.

[11] 3,969,579

[45] July 13, 1976

[54] CONTRAST, BRIGHTNESS AND PEAKING CONTROL CIRCUIT

[75] Inventors: Robert Patrick Logan, Batavia; Robert Charles Wheeler, Elba, both of N.Y.

[73] Assignee: GTE Sylvania Incorporated, Stamford, Conn.

[22] Filed: Nov. 21, 1975

[21] Appl. No.: 634,197

Related U.S. Application Data

[63] Continuation of Ser. No. 455,122, March 27, 1974, abandoned.

[52] U.S. Cl. .................... 178/7.3 R; 178/DIG. 26
[51] Int. Cl.² ........................................... H04N 5/14
[58] Field of Search ........ 178/7.3 R, 7.3 DC, 7.5 R, 178/7.5 DC, DIG. 26; 358/39

[56] References Cited
UNITED STATES PATENTS

| | | | |
|---|---|---|---|
| 2,295,059 | 9/1942 | Smyth | 178/7.5 R |
| 2,514,112 | 7/1950 | Wright et al. | 315/30 |
| 3,225,139 | 12/1965 | Massman | 178/7.3 DC |
| 3,240,875 | 3/1966 | Thomas | 178/7.5 DC |
| 3,306,976 | 2/1967 | Massman et al. | 178/7.3 DC |

*Primary Examiner*—John C. Martin
*Attorney, Agent, or Firm*—Norman J. O'Malley; Thomas H. Buffton; Cyril A. Krenzer

[57] ABSTRACT

A secondary control circuit including contrast control, brightness control, and a peaking circuit means are all disposed on a printed circuit board and coupled into the video circuit of a television receiver by one pair of connectors.

3 Claims, 2 Drawing Figures

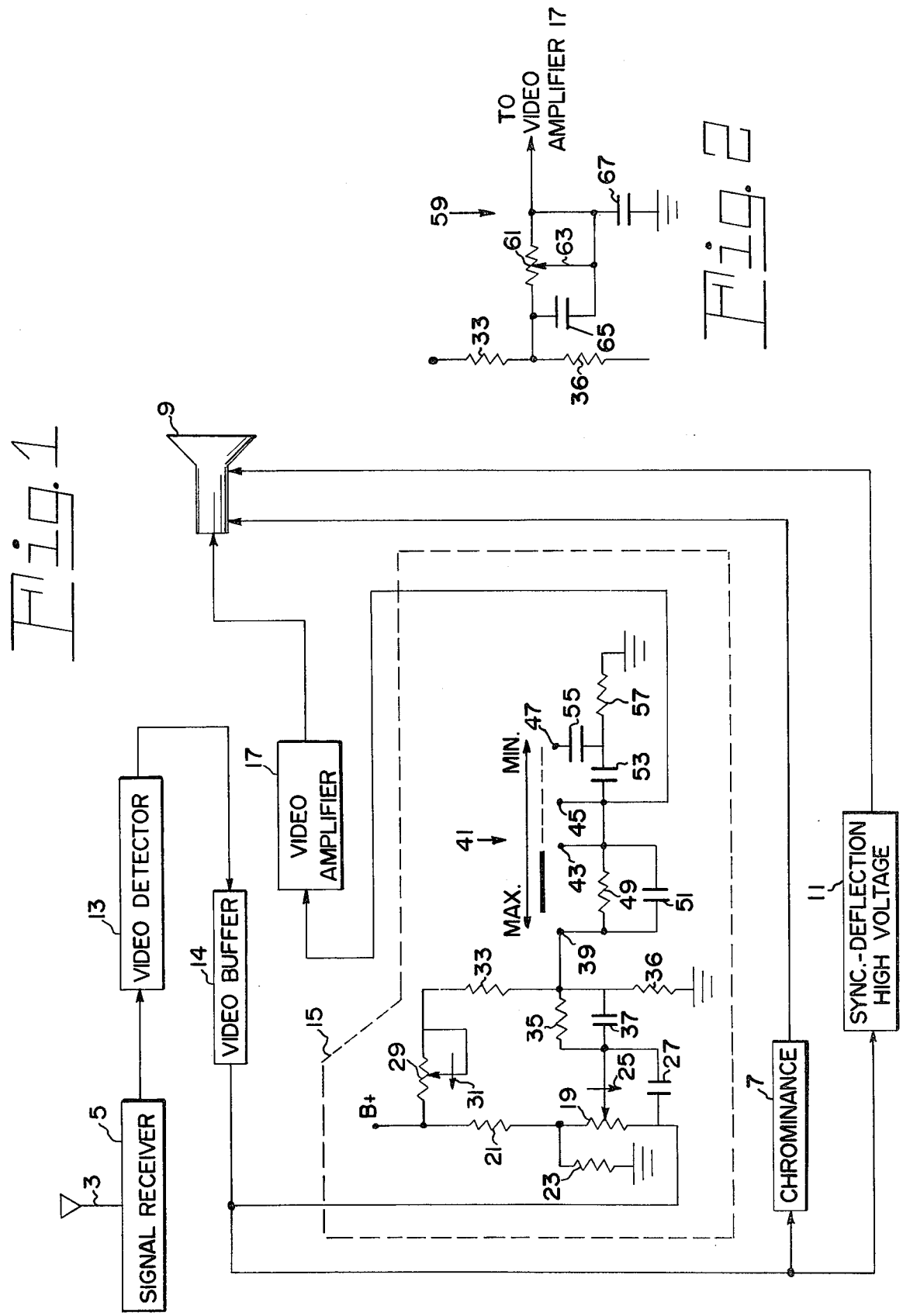

CONTRAST, BRIGHTNESS AND PEAKING CONTROL CIRCUIT

This is a continuation of application Ser. No. 455,122, filed Mar. 27, 1974, now abandoned.

BACKGROUND OF THE INVENTION

In most of the available television receivers, a viewer has available manually operable controls for varying contrast, brightness, and peaking of the video signal. In all of the known and available television circuits, each one of the abovementioned controls is separate and distinct from the other. Moreover, each must be positionally located such that a viewer or operator can readily manipulate the control and provide the desired adjustments.

Unfortunately, individually locating each of these controls in an operable position requires the employment of relatively long wires extending to the control. Each of these undesired long wires tends to act as an antenna causing pickup and regeneration problems which unfortunately appear on and detract from an image displayed on a cathode ray tube. Also, the cost of employing separately located controls for each separate function as well as the costs in assembly, brackets, and associated components are undesirable features in any apparatus.

OBJECTS AND SUMMARY OF THE INVENTION

An object of the present invention is to provide an improved television receiver. Another object of the invention is to provide an enhanced television receiver having a secondary control circuit coupled to the video channel of the signal receiver by a single pair of connectors. Still another object of the invention is to provide a secondary control circuit whereon the features of contrast, brightness, and peaking of a video signal are all disposed and connected to the video portion of the signal receiver by a single pair of connectors.

These and other and further objects, advantages and capabilities are achieved in one aspect of the invention by a secondary control circuit having a contrast control means, a brightness control means, and peaking circuitry means with a single pair of connectors coupling the above-mentioned controls to the video circuitry of the television receiver.

BRIEF DESCRIPTION OF THE DRAWINGS

FIG. 1 is a schematic illustration of a secondary control circuit utilized in a television receiver; and FIG. 2 illustrates an alternative form of peaking control circuitry.

DESCRIPTION OF THE PREFERRED EMBODIMENT

For a better understanding of the present invention, together with other and further objects, advantages and capabilities thereof, reference is made to the following disclosure in conjunction with the accompanying drawing.

In the drawing, a transmitted television signal is intercepted by an antenna 3 coupled to a signal receiver 5. The signal receiver 5 includes the usual RF and IF amplifier and detector stages and provides a composite television output signal.

One output from the signal receiver 5 is applied to a chrominance channel 7 which is, in turn, coupled to a cathode ray tube or image reproducer 9. Another output from the signal receiver 5 is applied to a synchronization deflection and high voltage development stage 11 which is also coupled to the cathode ray tube 9. Still another output from the signal receiver 5 is applied via a video detector stage 13 to a video buffer stage 14. Video buffer stage 14 is coupled to a secondary control circuit 15 which is connected by a video amplifier stage 17 to the cathode ray tube or image reproducer 9.

The secondary control circuit 15 includes an adjustable resistor or contrast control 19 having one end coupled to the output of the video buffer stage 14 and the opposite end coupled by way of a resistor 21 to a potential source B+. The junction of the adjustable resistor 19 and resistor 21 is connected by a resistor 23 to circuit ground. The adjustable resistor has an alterable arm 25 with a high frequency by-pass capacitor 27 coupling the alterable arm to the output of the video buffer stage 14.

The junction of the resistor 21 and potential source B+ is coupled to one end of another alterable resistor or brightness control 29. The alterable resistor or brightness control 29 has an adjustable arm 31 which is coupled to the opposite end thereof and to a resistor 33. The resistor 33 is coupled to the junction of a parallel connected resistor 35 and capacitor 37 which are, in turn, coupled to the alterable arm 25 of the adjustable resistor or contrast control 19.

Also, the junction of the resistor 33 and the parallel connected resistor 35 and capacitor 37 is coupled to a first contact 39 of a peaking circuit means 41. The peaking circuit means 41 includes a second contact 43, a third contact 45, and a fourth contact 47. A parallel connected resistor 49 and capacitor 51 are shunted across the first and second contacts 39 and 43. A pair of capacitors 53 and 55 are series connected intermediate the third and fourth contacts 45 and 47 respectively. Moreover, a resistor 57 couples the junction of the capacitors 53 and 55 to circuit ground.

As to operation, a composite video signal available from the video buffer stage 14 is applied to the first adjustable resistor or contrast control 19. The other end of the contrast control 19 is coupled to the junction of a pair of resistors 21 and 23 which are, in turn, connected intermediate the potential source B+ and ground. Thus, there is a minimal DC drop across the contrast control 19 whereby undesired variations or changes in brightness due to a shift in positional location of the contrast control 19 is minimized.

Also, the adjustable arm 25 of the contrast control 19 is connected to the resistor 35 which in conjunction with the resistor 36 serves as a voltage divider to lower the DC component of the video signal. However, the AC level of the video signal remains unchanged due to the by-pass capacitor 37.

The adjustable resistor or brightness control 29 is thereof connected to the potential source B+ and the opposite end coupled by way of a resistor 33 to the junction of the resistors 35 and 36. As the adjustable arm 31 of the alterable resistor or brightness control 29 is varied, the DC level appearing at the junction of the resistors 35 and 36 is altered which changes the brightness level of the video signal applied to the peaking circuit means 41.

The peaking circuit means 41 has a maximum positional location when the first and second contacts 39 and 43 are short-circuited, a minimum positional location when the third and fourth contacts 45 and 47 are short-circuited, and a normal position when the second and third contacts 43 and 45 are short-circuited. When the peaking circuit means 41 is in the maximum positional location, the first contact 39 is directly connected to the junction of the resistors 35 and 36 and capacitor 37 whereat the previously mentioned by-pass capacitor 37 provides a very low AC impedance. Moreover, the maximum positional location of the peak switching means 41 short-circuits the parallel connected resistor 49 and capacitor 51. Thus the video signal available at the junction of resistors 35 and 36 and capacitor 37 is directly connected to the video amplifier stage 17.

In the normal positional location of the peaking circuit means 41, the second and third contacts 43 and 45 respectively are short-circuited. In this instance the parallel connected resistor 49 and capacitor 51 in conjunction with the capacitor 53 and resistor 57 form a roll off network whereby the high frequency portion of the video signal is effected.

In the minimum positional location of the peaking circuit means 41 the third and fourth contacts 45 and 47 respectively are short-circuited. Thereupon the capacitors 53 and 55 are parallel connected and a maximum roll off of the high frequency portion of the video signal is effected.

Alternatively, FIG. 2 illustrates a preferred continuously adjustable peaking control 59 which can replace the peaking circuit means 41. Herein, a video output signal available at the junction of the series connected resistors 33 and 36 is coupled by an adjustable resistor 61 to the video amplifier stage 17. The adjustable resistor 61 has an alterable arm 63 coupled by a first capacitor 65 to the junction of the resistors 33 and 36 and by a second capacitor 67 to circuit ground.

Thus there has been provided a unique secondary control circuit suitable for disposition on a single printed circuit panel and including contrast and brightness control circuits as well as a peaking circuit. More importantly, the secondary control circuit is coupled to the video channel of a signal receiver by a single pair of connections. In this manner a plurality of relatively expensive long wires are eliminated thereby reducing cost and inhibiting numerous signal pickup and regeneration problems associated with undesired long wire connections.

While there has been shown and described what is at present considered the preferred embodiment of the invention, it will be obvious to those skilled in the art that various changes and modifications may be made therein without departing from the invention as defined by the appended claims.

What is claimed is:

1. In a television receiver having a video signal channel, a secondary control circuit comprising:
   a potential source;
   first voltage divider means coupling said potential source to a potential reference level;
   second potential divider means including an adjustable brightness control means coupling said potential source to a potential reference level;
   adjustable contrast control means coupled to said first potential divider means and via parallel connected AC and DC coupling means to said second potential divider means;
   adjustable peaking control means directly connected to said second potential divider means and said parallel connected AC and DC coupling means and to a potential reference level; and
   a pair of connectors coupling said secondary control circuit to said video signal channel including a first connector coupling said video signal channel to said adjustable contrast control means and a second connector coupling said adjustable peaking means to said video signal channel.

2. The secondary control circuit of claim 1 wherein said parallel connnected AC and DC coupling means is in the form of a parallel connected resistor and capacitor.

3. The secondary control circuit of claim 1 wherein said adjustable peaking control means is in the form of a switching means having a plurality of positional locations including a maximum positional location for directly coupling said second potential divider means and said parallel connected AC and DC coupling means to said video signal channel.

* * * * *